United States Patent
Maity et al.

(10) Patent No.: US 11,417,119 B2
(45) Date of Patent: Aug. 16, 2022

(54) METHOD AND SYSTEM FOR NAVIGATING VEHICLES BASED ON ROAD CONDITIONS DETERMINED IN REAL-TIME

(71) Applicant: Wipro Limited, Bangalore (IN)

(72) Inventors: Sandip Kumar Maity, Paschim Medinipur (IN); Debasish Chanda, Parganas (IN); Sumit Shovon Mitra, New Town (IN)

(73) Assignee: Wipro Limited, Bangalore (IN)

( * ) Notice: Subject to any disclaimer, the term of this patent is extended or adjusted under 35 U.S.C. 154(b) by 71 days.

(21) Appl. No.: 17/109,191

(22) Filed: Dec. 2, 2020

(65) Prior Publication Data

US 2022/0108116 A1 Apr. 7, 2022

(30) Foreign Application Priority Data

Oct. 6, 2020 (IN) .............................. 202041043506

(51) Int. Cl.
*G06T 7/00* (2017.01)
*G06V 20/56* (2022.01)
(Continued)

(52) U.S. Cl.
CPC .............. *G06V 20/588* (2022.01); *G06T 7/13* (2017.01); *G06T 7/62* (2017.01); *G06T 17/05* (2013.01);
(Continued)

(58) Field of Classification Search
CPC ......... G06G 3/014; G06T 15/04; G06T 19/20; G06T 19/006; G06F 3/04815; G06F 3/04883; G02B 27/0172
(Continued)

(56) References Cited

U.S. PATENT DOCUMENTS 9,652,980 B2 * 5/2017 Zhang .................. G06V 20/584
9,852,357 B2 12/2017 Zhang et al.
11,003,308 B1 * 5/2021 Dryer .................... G06F 3/0304

FOREIGN PATENT DOCUMENTS

JP H05265547 A 10/1993

OTHER PUBLICATIONS

Appiah, N. et al., "Obstacle detection using stereo vision for self-driving cars", 2016, https://web.stanford.edu/class/ee368/Project_Autumn_1516/Reports/Appiah_Bandaru.pdf, 7 pages.
(Continued)

*Primary Examiner* — Phuoc H Doan
(74) *Attorney, Agent, or Firm* — Finnegan, Henderson, Farabow, Garrett & Dunner, LLP

(57) ABSTRACT

A method and system for navigating vehicles based on road conditions determined in real-time is disclosed. The method includes the steps of receiving a first dataset including an image of a section of a road within a Field of View (FOV) of a camera attached to a vehicle and a second dataset associated with the road. The method further includes detecting edges and a vanishing point in the image, correcting road perspectivity in the image, and determining surface anomalies in the road based on a set of parameters, the second dataset and a Time of Flight technique (ToF), creating a digital elevation model for the image, and assigning a value, in real-time, from a predefined value range to each of a plurality of grids in the image based on a digital elevation model to generate a digital elevation image. The set of parameters includes volume associated with the surface anomalies.

20 Claims, 16 Drawing Sheets

(51) Int. Cl.
*G06T 7/13* (2017.01)
*G06T 17/05* (2011.01)
*G06T 7/62* (2017.01)

(52) U.S. Cl.
CPC ............... *G06T 2207/20084* (2013.01); *G06T 2207/30252* (2013.01)

(58) Field of Classification Search
USPC .......................................... 382/104; 345/633
See application file for complete search history.

(56) References Cited

OTHER PUBLICATIONS

Jo, Y, et al., "Pohole Detection System using a Black-Box Camera", 2015, Sensors, vol. 15, pp. 29316-29331.

Kim, M., "Path Planning and Following for Autonomous Vehicles and Its Application to Intersection with Moving Obstacles", 2017, University of Florida, 91 pages.

* cited by examiner

METHOD AND SYSTEM FOR NAVIGATING VEHICLES BASED ON ROAD CONDITIONS DETERMINED IN REAL-TIME

TECHNICAL FIELD

The present invention relates to road condition detection systems. In particular, the present invention relates to method and system for navigating vehicles based on road conditions determined in real-time.

BACKGROUND

Over time, roads may develop a lot of aberrations, for example, potholes and humps, which may cause damage to various vehicle components or the vehicle as a whole, when the vehicle encounters these aberrations (i.e., potholes or humps). The reason behind these aberrations may be heavy rains, oil spills, and heavy vehicle movement. In addition to the vehicle getting damaged, the vehicle may also end up colliding with other vehicles, while avoiding a pothole or a hump. This may lead to injuries to drivers, pedestrians, or passengers. Further, roads usually include speed breakers that may have inconsistent dimensions. Traversing these speed breakers, which are mostly not clearly visible, may also lead to accidents and damage to vehicles.

Moreover, in poor light conditions or during night, these problems may further get aggravated. Such road conditions (for example, potholes) may also pose aggravated risks during rains, when a road gets filled up with water. In such situations, it may become difficult for a driver or even an autonomous vehicle to determine depth of potholes or condition of the road otherwise to accurately and efficiently determine desired driving path or speed for the vehicle.

Various conventional systems and methods are available for navigating the vehicles based on road conditions. However, the conventional systems and methods do not determine the vehicle path in real-time while the vehicle is moving, based on the current road conditions.

SUMMARY

In one embodiment, a method for navigating vehicles based on road conditions determined in real-time is disclosed. In one embodiment, the method may include receiving a first dataset including an image of a section of a road within a Field of View (FOV) of a camera attached to a vehicle and a second dataset associated with the road. The method may further include detecting edges and a vanishing point in the image based on the first dataset using an image processing technique. The method may further include correcting road perspectivity in the image based on at least one of the edges, the vanishing point, and the FOV. The method may further include determining surface anomalies in the road based on a set of parameters, based on the second dataset and a Time of Flight technique (ToF). It should be noted that the set of parameters may include volume associated with the surface anomalies. The method may further include creating a digital elevation model for the image based on the road perspectivity, the surface anomalies, and an output of processing the image by a Convolutional Neural Network (CNN). The CNN may be trained to identify road conditions from a plurality of test images. The method may further include assigning, in real-time, a value from a predefined value range to each of a plurality of grids in the image based on a digital elevation model to generate a digital elevation image. It should be noted that each value in the predefined value range may represent condition of the road in an associated grid from the plurality of grids, and the digital elevation image may be used to navigate the vehicle.

In yet another embodiment, a system for navigating vehicles based on road conditions determined in real-time is disclosed. The system includes a processor and a memory communicatively coupled to the processor, wherein the memory stores processor instructions, which, on execution, causes the processor to receive a first dataset including an image of a section of a road within a FOV of a camera attached to a vehicle and a second dataset associated with the road. The processor instructions further cause the processor to detect edges and a vanishing point in the image based on the first dataset using an image processing technique. The processor instructions further cause the processor to correct road perspectivity in the image based on at least one of the edges, the vanishing point, and the FOV. The processor instructions further cause the processor to determine surface anomalies in the road based on a set of parameters, based on the second dataset and a ToF. The set of parameters may include volume associated with the surface anomalies. The processor instructions further cause the processor to create a digital elevation model for the image based on the road perspectivity, the surface anomalies, and an output of processing the image by a CNN. The CNN may be trained to identify road conditions from a plurality of test images. The processor instructions further cause the processor to assign, in real-time, a value from a predefined value range to each of a plurality of grids in the image based on a digital elevation model to generate a digital elevation image. It should be noted that each value in the predefined value range may represent condition of the road in an associated grid from the plurality of grids, and the digital elevation image may be used to navigate the vehicle.

In yet another embodiment, a non-transitory computer-readable medium storing computer-executable instruction for navigating vehicles based on road conditions determined in real-time is disclosed. In one example, the stored instructions, when executed by a processor, may cause the processor to perform operations including receiving a first dataset including an image of a section of a road within a FOV of a camera attached to a vehicle and a second dataset associated with the road. The operations may further include detecting edges and a vanishing point in the image based on the first dataset using an image processing technique. The operations may further include correcting road perspectivity in the image based on at least one of the edges, the vanishing point, and the FOV. The operations may further include determining surface anomalies in the road based on a set of parameters, based on the second dataset and a ToF. It should be noted that the set of parameters may include volume associated with the surface anomalies. The operations may further include creating a digital elevation model for the image based on the road perspectivity, the surface anomalies, and an output of processing the image by a CNN. The CNN may be trained to identify road conditions from a plurality of test images. The operations may further include assigning, in real-time, a value from a predefined value range to each of a plurality of grids in the image based on a digital elevation model to generate a digital elevation image. It should be noted that each value in the predefined value range may represent condition of the road in an associated grid from the plurality of grids, and the digital elevation image may be used to navigate the vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
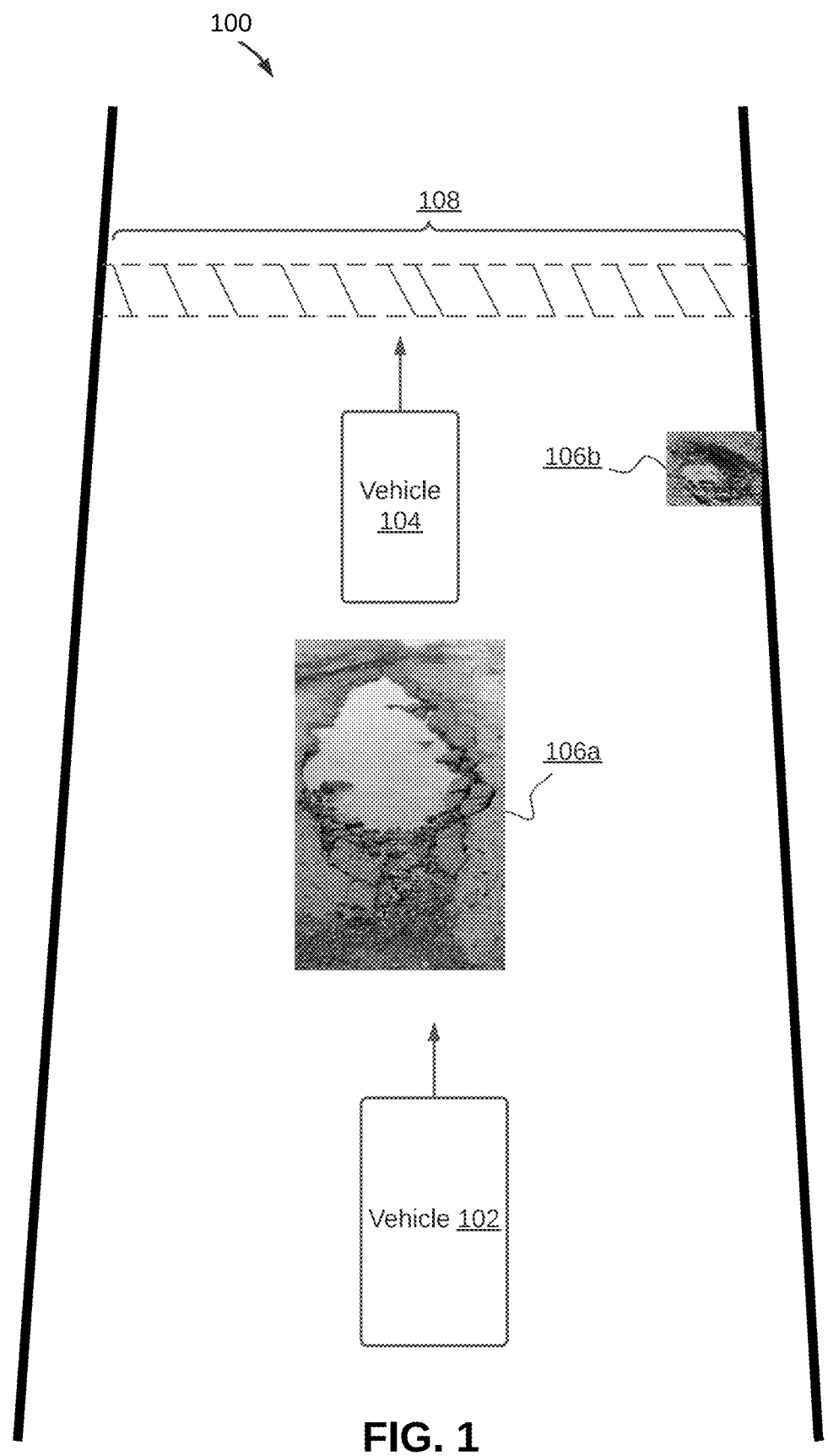
FIG. 1 is an exemplary environment in which various embodiments may be employed.

An exemplary environment 100 in which various embodiments may be employed, is illustrated in FIG. 1. The environment 100 depicts a section of a road. The environment 100 may further include vehicles 102 and 104 moving on the road in same direction. In some embodiments, there may also be other vehicles moving on the same road in the same or opposite direction as the vehicles 102 and 104. Further, the vehicles 102 and 104 may be user driven vehicles or autonomous vehicles. The section of the road may include surface anomalies or aberrations, for example potholes 106a, 106b, and a speed breaker 108. Other section of the road may also include different surface irregularities such as, a hump, an object, debris, water, and other surface irregularities.

Consider a scenario where the vehicle 102 is moving on a straight path with a high speed. The ride quality of the vehicle 102 on the road may be affected by the pothole 106a, as it may be difficult for the vehicle 102 or for driver of the vehicle 102 to determine depth of the pothole 106a, especially when is it is filled with water. The vehicle 102 may either have to abruptly change its path or in case the vehicle 102 is moving at a high speed, the vehicle 102 may have to cross the pothole 106a. In the latter case, the pothole 106a may have an impact on the vehicle 102. For example, depending on the depth of the pothole 106a and the speed of the vehicle 102, the pothole 106a may damage parts of the vehicle 102, when the vehicle 102 hits the pothole 106a. In the former case, as a result of the abrupt change in path, the vehicle 102 may end up colliding with another vehicle or the passengers within the vehicle 102 may get hurt.

Further, considering another scenario where the vehicle 104 is moving with high speed on the road towards the speed breaker 108. Now depending on the surface and height of the speed breaker 108, the vehicle 104 or the passenger inside the vehicle 104 may get adversely impacted. To avoid this situation, the vehicle 104 may either need to abruptly decrease the speed or may have to come to a grinding halt.

The above discussed situations or scenarios may be avoided by employing a navigation device in the vehicles 102 and 104. The navigation device may determine the road condition and may accordingly suggest a path and speed for navigating the vehicles 102 and 104. The navigation device is further explained in detail in conjunction with FIG. 2 to FIG. 14.

Figure 2:
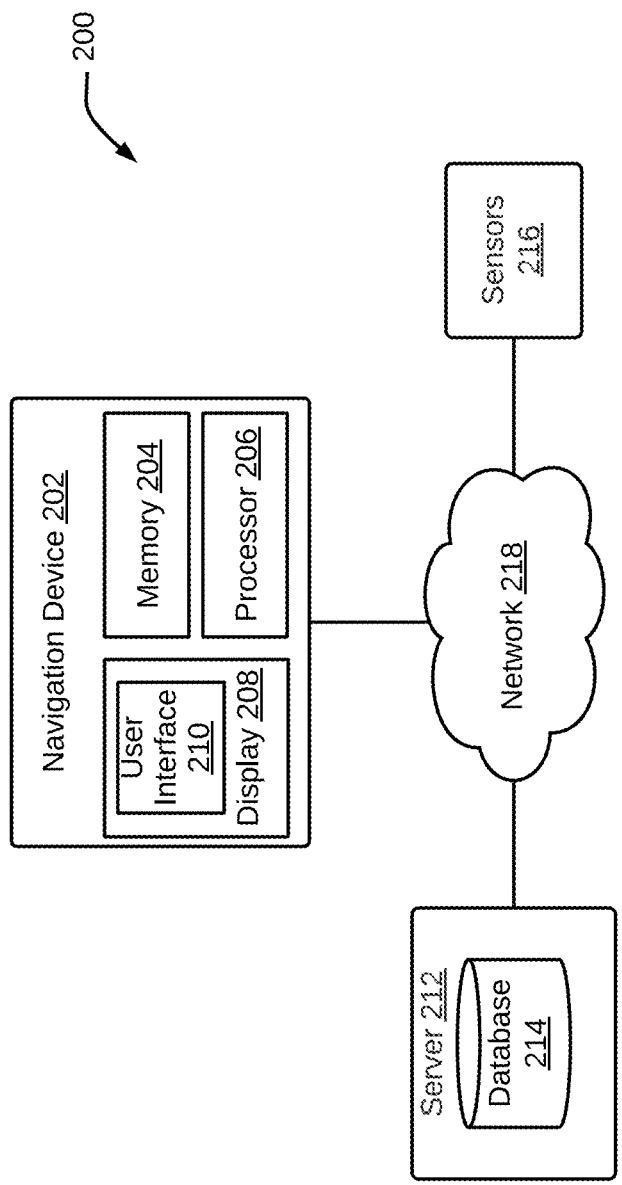
FIG. 2 is a block diagram of a system for navigating vehicles based on road conditions determined in real-time, in accordance with an embodiment.

Referring now to FIG. 2, a block diagram of a system 200 for navigating vehicles based on road conditions determined in real-time is illustrated, in accordance with an embodiment. The system 200 may include a navigation device 202 that may determine road condition and may accordingly provide recommendations to a vehicle (for example, the vehicles 102 and 104). In particular, the navigation device 202 may recommend a potential path and speed for navigating the vehicle on the potential path. The navigation device 202 may be integrated within the vehicle or may be located remotely from the vehicle. Examples of the navigation device 202 may include, but are not limited to a desktop, a laptop, a notebook, a netbook, a tablet, a smartphone, a mobile phone, an application server, or the like.

The navigation device 202 may include a memory 204, a processor 206, and a display 208. The memory 204 and the processor 206 of the navigation device 202 may perform various functions including receiving an image of a section of a road, detecting edges and vanishing point in the image, correcting road perspectivity in the image, determining surface anomalies in the road, creating a digital elevation model and topographic maps, identifying potential path, providing recommendations, and generating warnings. The memory 204 may store instructions that, when executed by the processor 206, may cause the processor 206 to navigate the vehicle 102 based on determined road conditions in real-time. The memory 204 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The display 208 may further include a user interface 210. A user or the administrator may interact with the navigation device 202 and vice versa through the user interface 210. By way of an example, the display 208 may be used to display results of analysis performed by the navigation device 202 (i.e. a potential path and speed for navigating the vehicle) to the user. By way of another example, the user interface 210 may be used by the user to provide inputs to the navigation device 202.

As will be described in greater detail in conjunction with FIG. 2 to FIG. 14, in order to determine road condition for navigating the vehicle 102, the navigation device 202 may extract a plurality of vehicle attributes, from a server 212, which may further include a database 214.

An image of a section of a road, and a set of parameters associated with surface anomalies may also be received by the navigation device 202 from one or more of a plurality of sensors 216 placed at various locations within the vehicle. Examples of sensors 216 may include, but are not limited to a camera, a Kinect like sensor, a distance sensor, an Infrared (IR) sensor, and the like. The plurality of sensors 216 may be communicatively coupled to the navigation device 202, via a network 218. The network 218 may be a wired or a wireless network and the examples may include, but are not limited to the Internet, Bluetooth, Near Field Communication (NFC), Wireless Local Area Network (WLAN), Wi-Fi, Long Term Evolution (LTE), Worldwide Interoperability for Microwave Access (WiMAX), and General Packet Radio Service (GPRS).

Figure 3:
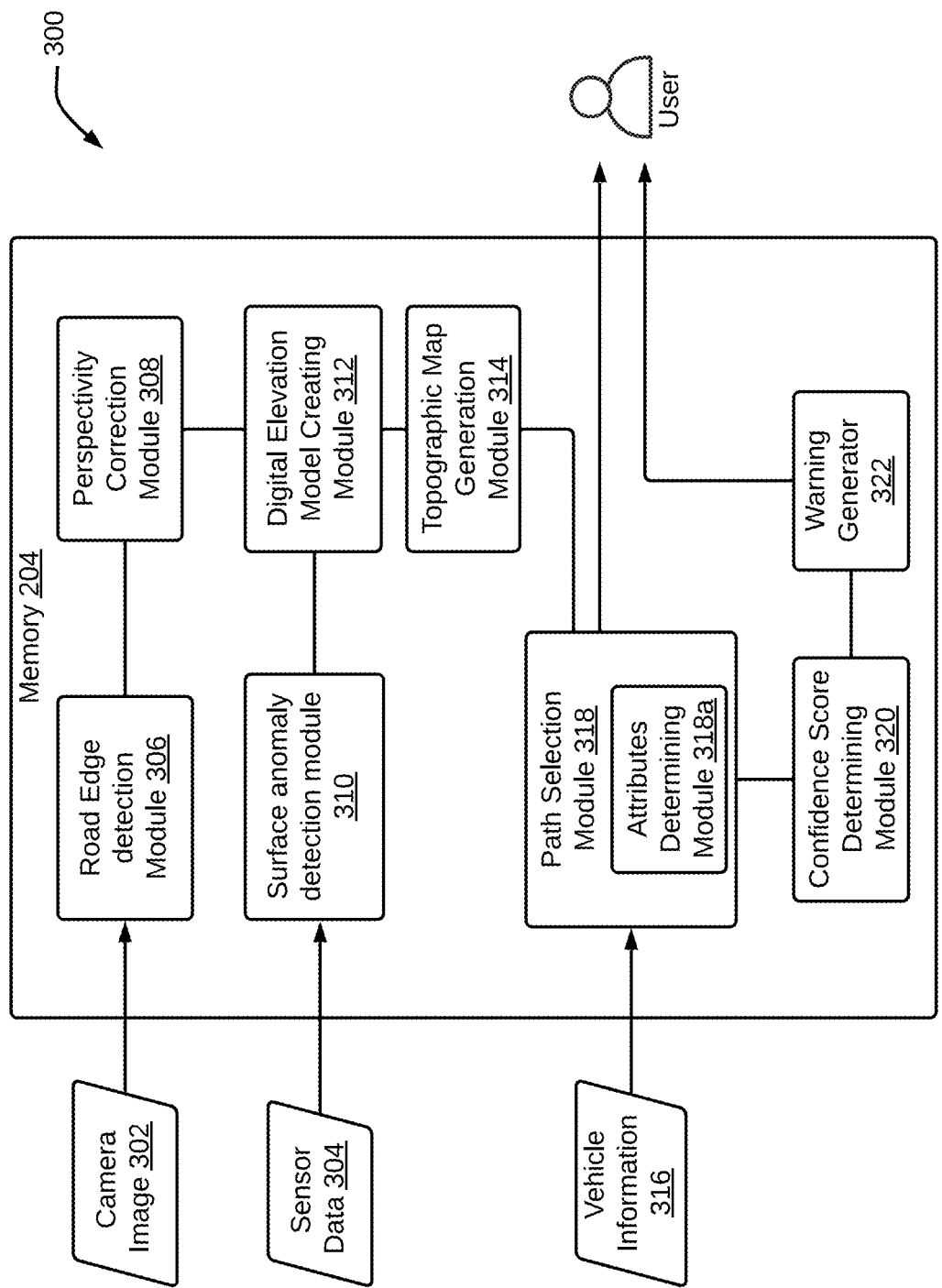
FIG. 3 is a functional block diagram of various modules within a memory of a navigation device configured to navigate vehicles based on road conditions determined in real-time, in accordance with an embodiment.

Referring now to FIG. 3, a block diagram of various modules within the memory 204 of the navigation device 202 configured to navigate vehicles based on road conditions determined in real-time is illustrated, in accordance with an embodiment. The memory 204 may include various modules for performing multiple operations in order to navigate the vehicles. The memory 204 may determine road conditions in real-time and subsequently provide a potential path to navigate a vehicle based on determined road conditions. Initially, the navigation device 202 may receive a camera image 302 (i.e., an image of a section of a road within field of view (FOV) of a camera and captured by the camera) and sensor data 304. The modules within the memory 204 for determining the road conditions may include a road edge detection module 306, a perspectivity correction module 308, a surface anomaly detection module 310, a digital elevation model creating module 312, and a topographic map generation module 314.

The road edge detection module 306 may receive the camera image 302, which is the image of a section of the road. Further, the road edge detection module 306 may be configured to detect edges and a vanishing point in the camera image 302. To this end, the road edge detection module 306 may use an image processing technique, for example, but not limited to Local Adaptive Share Voting (LASV). The vanishing point is nothing but an intersection point of road edges. In other words, where two lines in the image cross a single point, the single point may be referred to as the vanishing point. Therefore, the road edge detection module 306 may first detect edges in the camera image 302 and may then extend the edges till an intersection point of the edges is identified. Further, the road edge detection module 306 may be communicatively connected to the perspectivity correction module 308. This is further explained in detail in conjunction with FIG. 5 and FIG. 6.

The perspectivity correction module 308 may be configured to receive the results generated by the road edge detection module 306. Further, the perspectivity correction module 308 may correct road perspectivity in the camera image 302 based on at least one of the edges, the vanishing point, and the FOV. The perspectivity correction module 308 may correct the road perspectivity vertically as well as horizontally. This is further explained in detail in conjunction with FIGS. 7A to 7C.

The surface anomaly detection module 310 may be configured to receive the sensor data 304 and may determine surface anomalies or irregularities in the road based on analysis of the sensor data 304. In an embodiment, the surface anomalies or irregularities in the road may be determined based on a set of parameters, such as, but not limited to volume associated with the surface anomalies. To determine the surface anomalies, the surface anomaly detection module 310 may use a Time of Flight (ToF) technique. This is further explained in detail in conjunction with FIG. 4.

The digital elevation model creating module 312 may be operatively coupled to the perspectivity correction module 308 and the surface anomaly detection module 310. The digital elevation module 312 may create a digital elevation model for the image based on the road perspectivity, the surface anomalies, and an output of processing the camera image 302 by a Convolutional Neural Network (CNN). This is further explained in detail in conjunction with FIG. 10.

The topographic map generation module 314 may receive the digital elevation model from the digital elevation model creating module 312. Further, in some embodiments, a digital elevation image may be generated based on the digital elevation model. To generate the digital elevation image, the topographic map generation module 314 may assign a value from a predefined value range to each of a plurality of grids in the camera image 302. Each value in the predefined value range may represent a specific condition of the road in an associated grid from the plurality of grids. A topographic map for the road may be generated by the topographic map generation module 314 based on the value assigned to each of the plurality of grids in the digital elevation image. The topographic map may thus represent road conditions and may be used for safely navigating a vehicle on the road.

Further, the memory 204 of the navigation device 202 may receive vehicle information 316 in order to identify a potential path for navigation of the vehicle. To this end, the memory 204 may further include a path selection module 318, a confidence score determining module 320, and a warning generator 322. The vehicle information 316 may be received by the path selection module 318, which may further include an attributes determining module 318a. In order to find the potential path, the attributes determining module 318a may determine a plurality of vehicle attributes associated with the vehicle using the vehicle information 316. The plurality of vehicle attributes may include, but are not limited to wheel width of the vehicle, ground clearance height of the vehicle, a Center of Gravity (CG) of the vehicle, wheelbase of the vehicle, and number of wheels of the vehicle. In short, the path selection module 318 may identify a potential path from a plurality of paths for navigating the vehicle on the road based on the topographic map and the plurality of vehicle attributes associated with the vehicle.

The warning generator 322 may be communicatively coupled to the path selection module 318 via the confidence score determining module 320. The confidence score determining module 320 may determine a confidence score associated with the potential path. The confidence score may be determined based on a vehicle action while navigating the potential path and condition of the potential path. Further, a warning may be generated by the warning generator 322, when the confidence score associated with the potential path is less than a predefined threshold value. This is further explained in detail in conjunction with FIG. 11.

Figure 4:
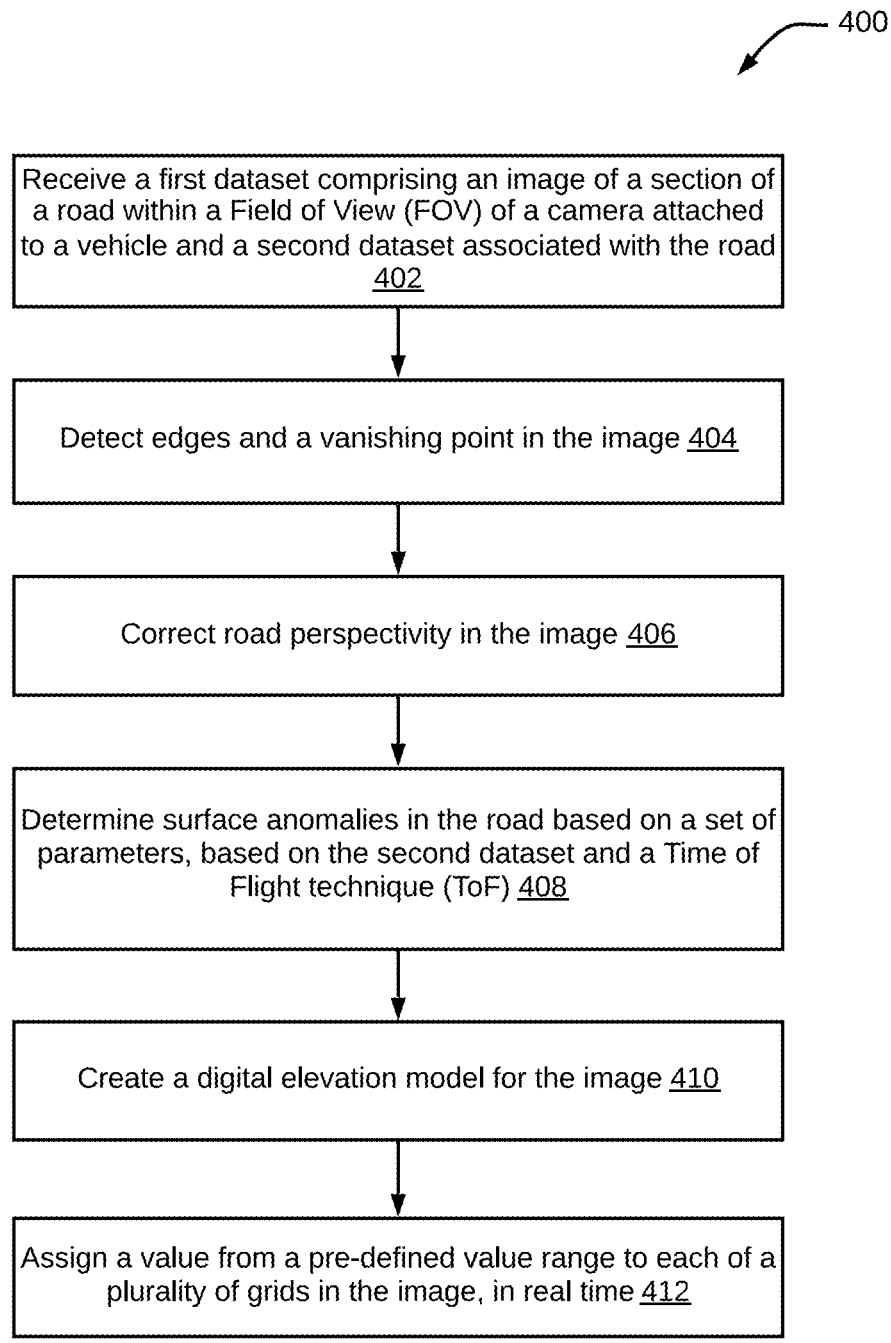
FIG. 4 is a flowchart of a method for navigating vehicles based on road conditions determined in real-time, in accordance with an embodiment.

Referring now to FIG. 4, a method for navigating vehicles based on road conditions determined in real-time is depicted via a flowchart 400, in accordance with an embodiment. Each step of the flowchart 400 may be performed by one or more of the modules 306-314 within the memory 204. At step 402, a first dataset and a second dataset may be received. The first dataset may include an image of a section of a road within a Field of View (FOV) of a camera attached to a vehicle. And, the second dataset may be associated with the road. At step 404, edges and a vanishing point in the image may be detected based on the first dataset. It may be noted that an image processing technique may be used to detect the edges and the vanishing point. This is further explained in conjunction with FIG. 5 and FIG. 6.

At step 406, road perspectivity may be corrected in the image. It may be noted that at least one of the edges, the vanishing point, and the FOV, may be considered to correct the road perspectivity. Road perspectivity correction is be further explained in conjunction with FIG. 7A-FIG. 7C. At step 408, surface anomalies in the road may be determined. The surface anomalies may also correspond to surface irregularities. To determine the surface anomalies, a set of parameters and the second dataset may be considered. Further, the ToF technique may be used to determine the surface irregularities. It should be noted that the set of parameters includes volume associated with the surface anomalies.

In some embodiments distance information may be captured by a sensor using the ToF. The distance may be calculated based on time taken in irradiating infrared light from the sensor and returning back to the sensor. The sensor may be selected from, but may not be limited to, a Kinect like sensor, a distance sensor, and an Infrared (IR) sensor. The sensor may convert the irradiated infrared light into a pulse wave. Further, coordinates of a point of reflection of the infrared light may be obtained to generate a Three-Dimensional (3-D) point cloud, which is a point cloud in a 3-D rectangular coordinate system, such as (x, y, z). Based on the 3-D point cloud, it may be possible to detect surfaces and people on the road. Moreover, 3-D point cloud may be colored and thus image processing may be performed in colored 3-D point clouds. Open source libraries may be used for the image processing.

At step 410, a digital elevation model may be created for the image based on the road perspectivity, the surface anomalies, and an output of processing the image through a Convolutional Neural Network (CNN), which is a deep learning network. It should be noted that the CNN may be trained to identify road conditions from a plurality of test images. By way of an example, the CNN may be trained to classify potholes and non-potholes by analyzing an image.

In some embodiments, various pre-trained Neural Network Models, such as, but not limited to ResNet50, ResNet152, ResNet50V2, ResNet152V2, InceptionV3, Inception ResNetV2 and DenseNet201 may also be used. In some embodiments, in order to create the digital elevation model, a relationship between the first dataset and the second dataset may be determined. To determine the relationship, Two Dimensional (2D) points in a 2D image may be mapped with 3D points in the real-world.

Thereafter, at step 412, a value may be assigned to each of a plurality of grids in the image from a predefined value range. The predefined value range, for example, may be from −10 to +10. In this case, negative sign may indicate depth, while the + sign may indicate height. Thus, each value in the predefined value range represents condition of the road in an associated grid from the plurality of grids. The value may be assigned based on the digital elevation model in order to generate a digital elevation image. Further, the generated digital elevation image may be used to navigate the vehicle. This is further explained in detail in conjunction with FIG. 8 and FIG. 9.

The plurality of grids may be a combination of pixels. However, the number of pixels in the grids may gradually decrease from nearest to farthest row of the FOV, as the perspectivity correction is performed. In some embodiments, minimum grid size may be considered as 3×3 pixels for the farthest row i.e. $0^{th}$ row positions. The number of pixels for rest of the rows may gradually increase, such that, each grid is square in shape.

Figure 5:
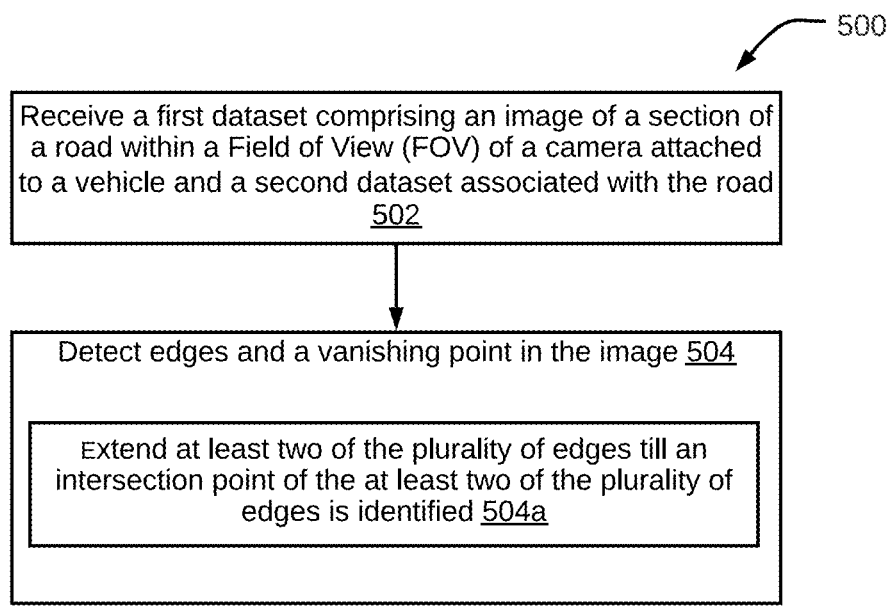
FIG. 5 is a flowchart of a method for detecting edges and vanishing point in an image, in accordance with an embodiment.

Referring now to FIG. 5, a method for detecting edges and a vanishing point in an image is depicted via a flowchart 500, in accordance with an embodiment. At step 502, a first dataset that includes an image of a section of a road within a FOV of a camera attached to a vehicle and a second dataset associated with the road may be received. At step 504, the edges and the vanishing point in the image may be detected based on the first dataset. An image processing technique may be used to detect the edges and the vanishing point. The step 504 may further include a step 504a, where at least two of the edges may be extended till an intersection point of the at least two of the edges is identified.

Figure 6:
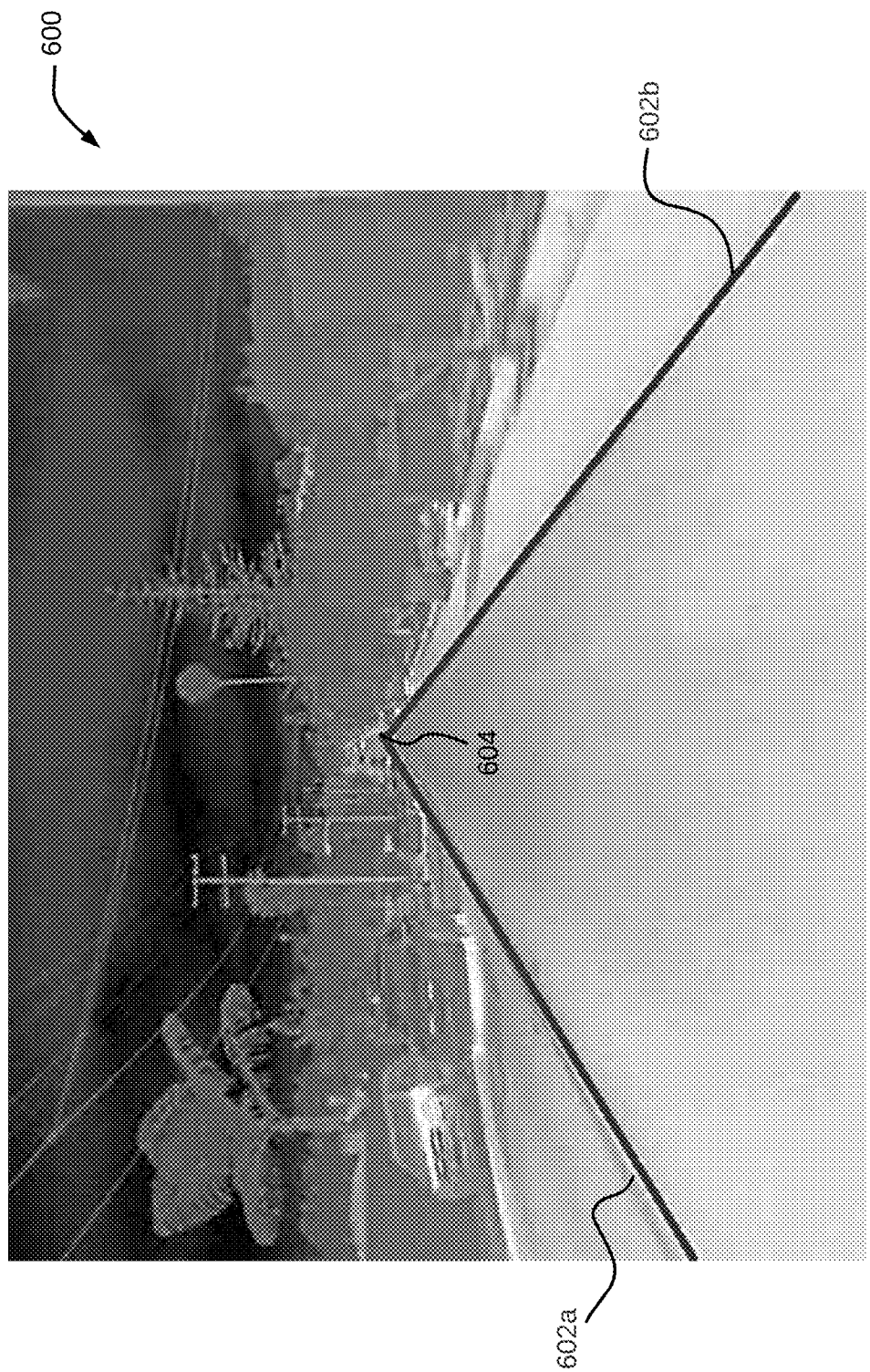
FIG. 6 is an exemplary image of a section of a road within a Field of View (FOV) of a camera and detected edges of the road, in accordance with an exemplary embodiment.

Referring now to FIG. 6, an exemplary image 600 of a section of a road within a Field of View (FOV) of a camera and detected edges of the road is illustrated, in accordance with an exemplary embodiment. For an unmarked road, edge detection may be a way to determine road area and structure of the road. Therefore, the navigation device 202 may identify edges 602a and 602b in the image 600. The image 600 may be captured using the camera attached to a vehicle. The image 600 may be processed using an image processing technique to identify the edges 602a and 602b and a vanishing point 604. As illustrated in FIG. 6, the edges 602a and 602b may be further extended till the vanishing point 604 is detected In some embodiments, an LASV technique may be used to process the image 600. In some other embodiments, some other standard image processing techniques may be used. As is clearly visible in FIG. 6, the road width in the image 600 is not same throughout the length of the road section. In other words, the edges 602a and 602b of road are not parallel as they cross at a single point, i.e., the vanishing point 604. However, in reality, the road width may almost be the same, and the edges may be parallel to each other. Thus, in order to get a real or actual view, the road perspectivity correction may be performed, which is further explained in conjunction with FIGS. 7A to 7C.

Figure 7A:
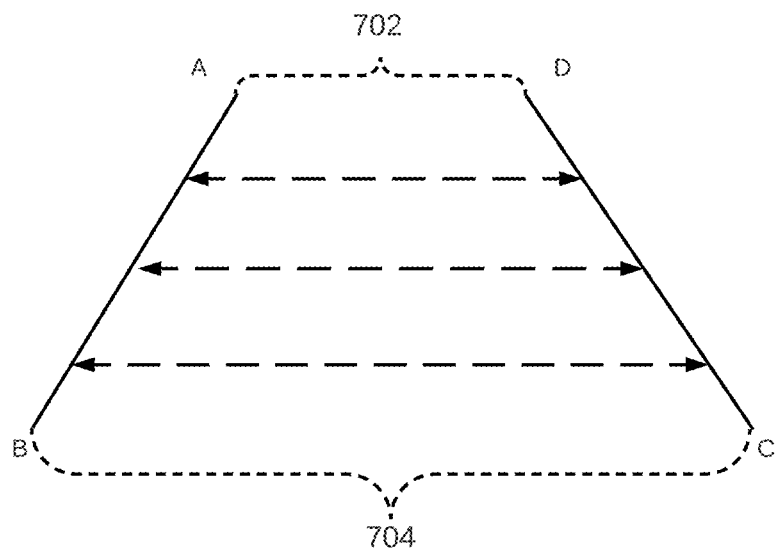
FIGS. 7A-7C illustrate road perspectivity correction for an image captured by a camera installed on a vehicle, in accordance with an exemplary embodiment.
Figure 7B:
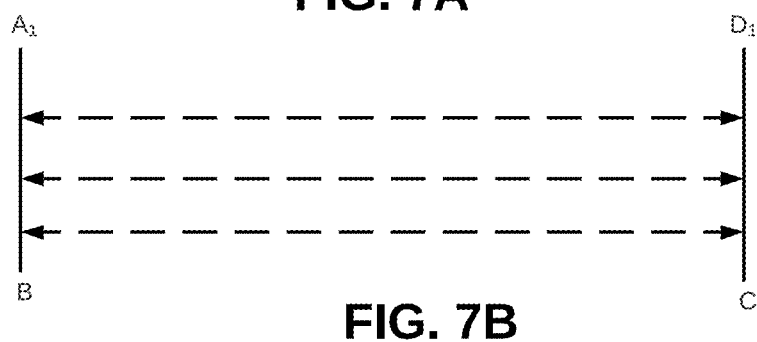
Figure 7C:
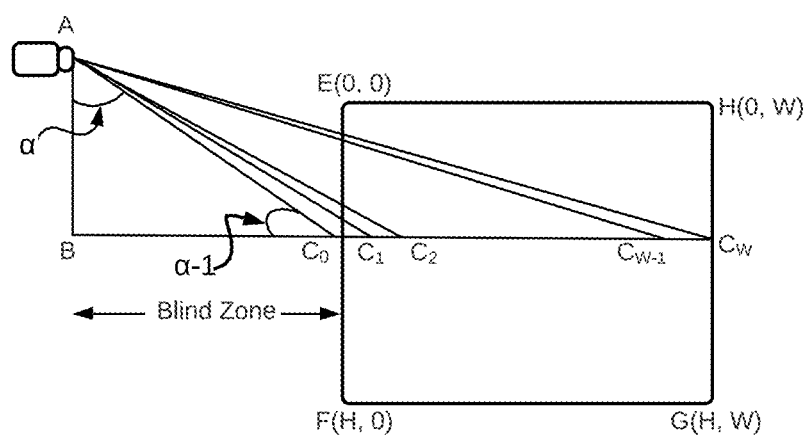

Referring now to FIGS. 7A-7C, road perspectivity correction for an image captured by a camera installed on a vehicle is illustrated, in accordance with an exemplary embodiment. FIG. 7A represents the image of a road section as captured by the camera. A portion of the area of the road section, represented by 'ABCD' (or the FOV) may be considered for road perspectivity correction, such that, A, B, C, D, may be image coordinates. In real world, the width 'AD' is equal to the width 'BC'. However, as is apparent from FIG. 7A, in the image 600 the width 'AD' (or a section 702) and 'BC' (a section 704) are different. The section 702 represents the farthest width ('AD') of the road for the FOV and the section 704 represents the nearest width ('BC') of the road for the FOV. The magnitude of this difference may depend upon the angle of the camera with respect to the road surface (or the camera down angle). Perspectivity per row, for the portion 'ABCD' of the image, may be calculated as per equation (1), given below. Since the camera angle for a given vehicle would be fixed, this would be a onetime calculation for every vehicle. Additionally, perspectivity per row may depend upon camera height, camera down angle, and camera resolution:

$$\text{Perspectivity per Row}=f(\text{Length of Road, Width of Road, Image Coordinates } A, B, C, D) \quad (1)$$

FIG. 7B represents vertical perspectivity correction. The road perspectivity correction may be performed by interpolating pixels in each row keeping a fixed distance 'BC' throughout. Therefore 'A' is shifted to 'A$_1$', and 'D' is shifted to 'D$_1$', as depicted in FIG. 7B. Here, the pixels may be inserted in every row from bottom to top in order to form a rectangle. Hence, the road area becomes 'A$_1$BCD$_1$.

In addition to correcting the vertical perspectivity of the image, horizontal perspectivity correction may also be performed. This is depicted in FIG. 7C. For horizontal perspectivity correction 'EFGH' is considered as the FOV. In FIG. 7C, 'A' is the source of light in terms of position of the camera, 'AB' is the camera height and 'BC$_0$' is a blind zone for the camera. Further, 'α' represents the down angle of the camera, which may be changed according to speed of the vehicle as the down angle 'α' controls the FOV. It should be noted that height and position of the camera is constant and a user may be required to input four points of the FOV, which are E, F, G, and H in the current case. In an exemplary embodiment, the road perspectivity correction may be performed using the equations 2, 3, 4, 5 and, 6 given below:

$$\angle AC_WB = \tan^{-1}\left(\frac{AB}{BC_W}\right) \quad (2)$$

$$\angle C_0AC_W = (90° - \angle AC_WB) - \alpha = \left(90° - \tan^{-1}\left(\frac{AB}{BD}\right)\right) - \alpha \quad (3)$$

$$AngleDistribution = \angle C_iAC_{i+1} = \frac{\angle C_0AC_W}{w} \quad (4)$$

$$i^{th}pixelRealDist = \quad (5)$$
$$C_iC_{i+1} = (AB * \tan(\alpha + (i * angleDistribution))) - BC_i$$

$$i^{th}pixelRealDist \leq \left(\frac{widthOfTyre}{9}\right) \quad (6)$$

Here, each pixel from 'i$^{th}$' pixel is covering the real world distance of i$^{th}$pixelRealDist from equation 5. So, every pixel in 'i$^{th}$' pixel may represent i$^{th}$pixelRealDist×i$^{th}$pixelRealDist amount of area. The equation 6 is taken as a consideration, thus, the FOV and resolution of the camera has to be fixed based on speed of the vehicle and width of tyres of the vehicle.

Figure 8:
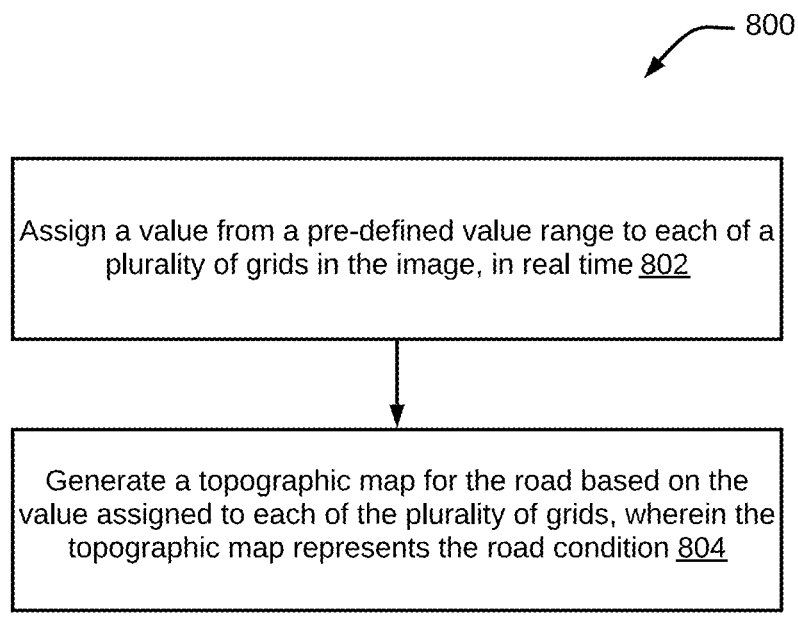
FIG. 8 is a flowchart of a method for generating topographic maps for a road, in accordance with an embodiment.

Referring now to FIG. 8, a method for generating topographic map for a road is depicted via a flowchart 800, in accordance with an embodiment. At step 802, a value may be assigned to each of a plurality of grids in the image from a predefined value range. The value may be assigned based on a digital elevation model to generate a digital elevation image. It may be noted that each value in the predefined value range may represent condition of the road in an associated grid from the plurality of grids. At step 804, the topographic map may be generated for the road. The topographic map may be generated based on the value assigned to each of the plurality of grids. By way of an example, each value from the predefined value range may have an associated color mapped to it. Thus, each grid may be assigned a color based on value of the grid to generate the topographic map, which may represent the road condition. This is further explained in detail in conjunction with FIGS. 9A-9C.

Figure 9A:
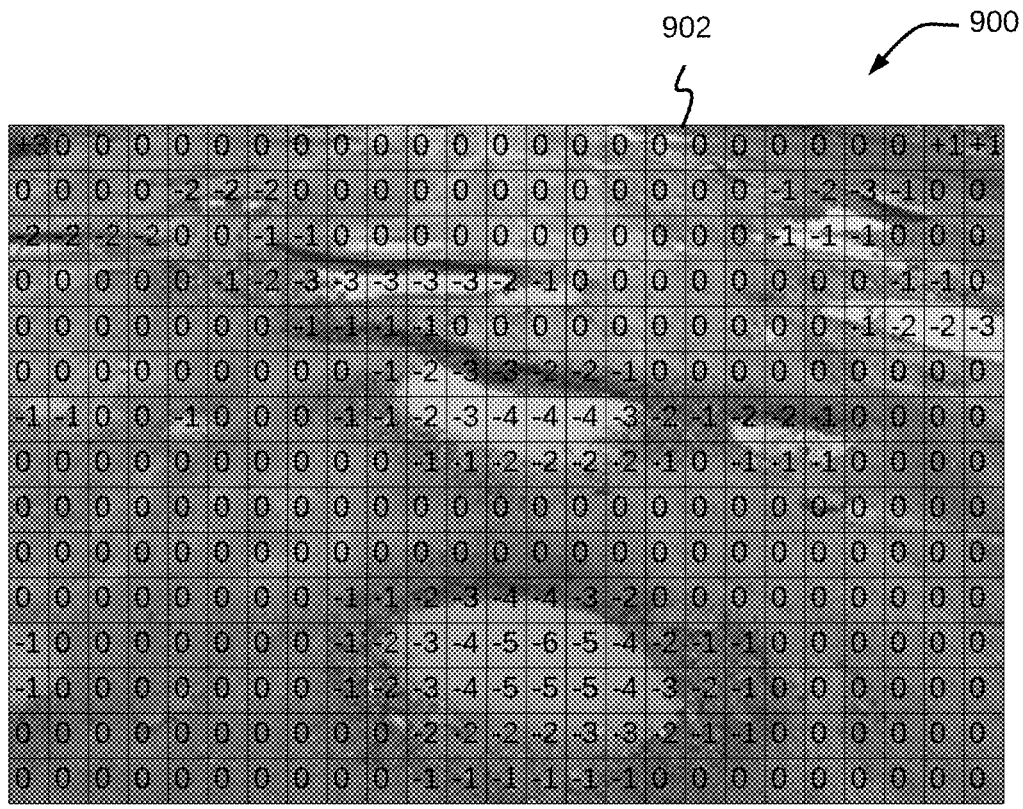
FIGS. 9A-9C depict digital elevation images and a topographic map for various road sections of a road, in accordance with an exemplary embodiment.
Figure 9B:
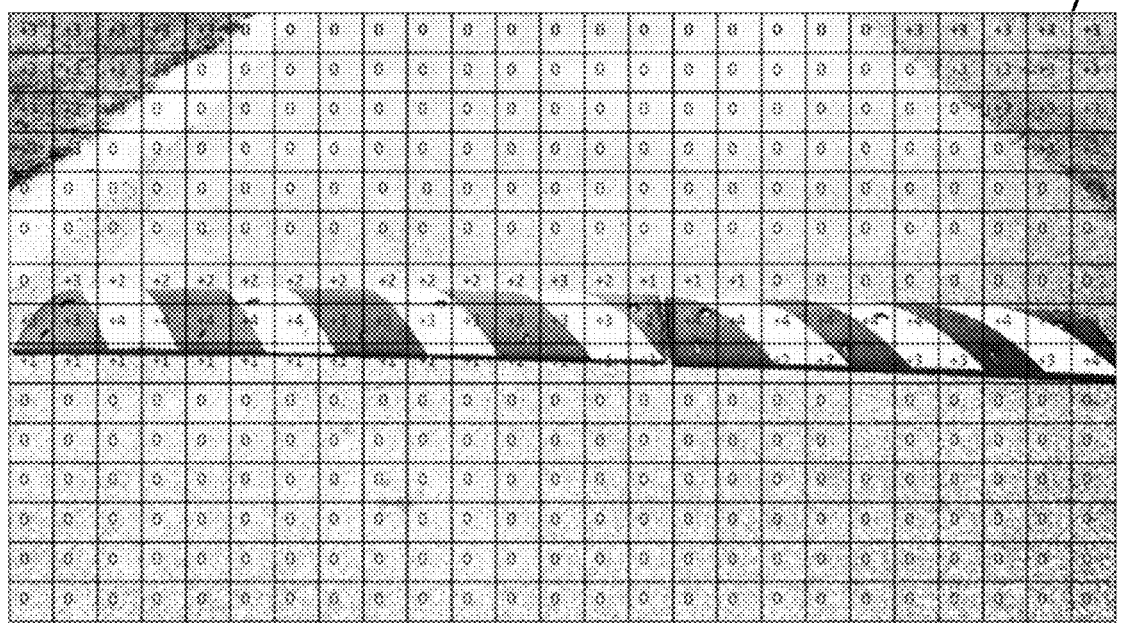
Figure 9C:
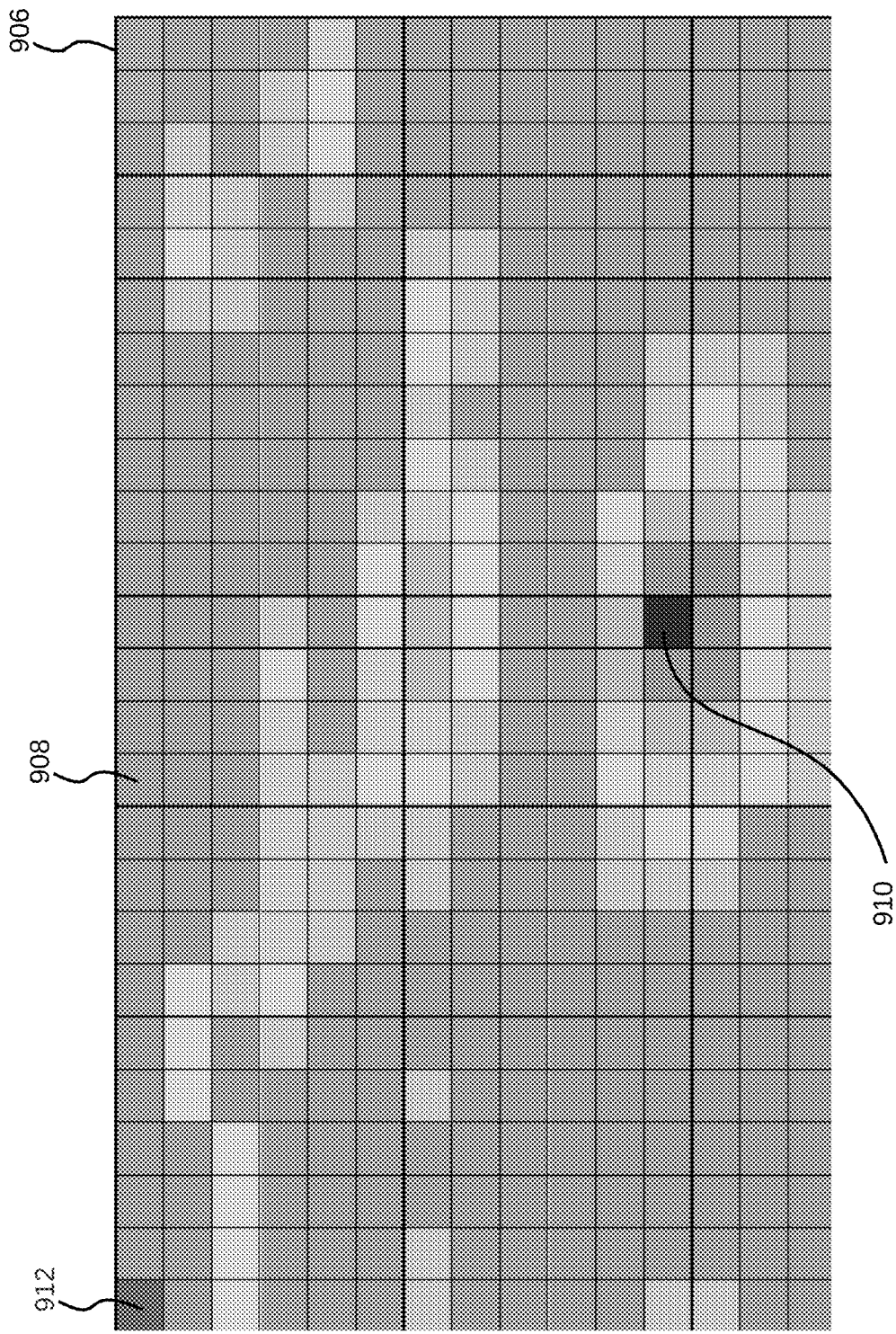

Referring now to FIGS. 9A-9C, digital elevation images 902 and 904 and a topographic map 906 for various road sections of a road are illustrated, in accordance with an exemplary embodiment. The digital elevation images 902 and 904 correspond to two different sections of the road. A first section of the road (corresponding to the digital elevation image 902) may include a plurality of potholes and a second section of the road (corresponding to the digital elevation image 904) may include a speed breaker. The digital elevation images represent a scaled height and depth value for each and every grid. The scaled height and depth value may be selected from a predefined value range. For these exemplary road sections, the predefined value range may vary from +10 to −10. The predefined value range may be varied and customized by a user. It may be noticed that each grid in the digital elevation images 902 and 904 are assigned a value from the predefined range based on condition of a portion of the road covered by each grid. The value for each grid may be calculated based on normalized road condition data. In an exemplary embodiment, values for grids may be calculated using equation 7 given below:

$$PixelZvalue = MAX(Param1, Param2, Param3) \quad (7)$$

In the equation 7, each of the parameters, i.e., Param1, Param2, and Param3 represent normalized road condition data. The determination of the road condition data is explained in detail in conjunction with FIG. 10. In the digital elevation images 902 and 904, the value '0' represents smooth road, a negative value represents depth of pothole and a positive value represents height of the speed breaker or an obstacle. A high negative and positive values may indicate that condition of the road is bad. Further, in FIG. 9C the topographic map 906 represents the topographic grid view as a false color based on height and depth of the roads. Different colors may be used for different grids based on the values assigned to the grids. For example, for a smooth road or the value '0', a color 908 may be used. Further, for the value '−6', a color 910, and for '+4' a color 912 may be used.

Figure 10:
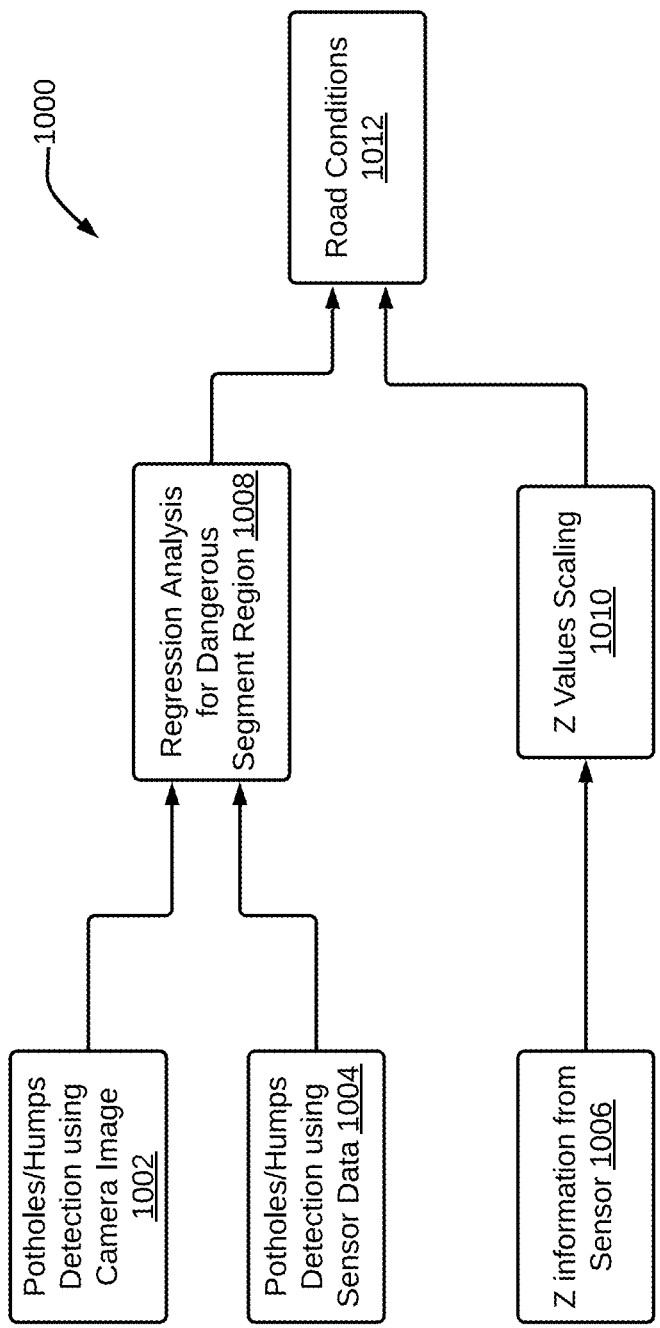
FIG. 10 depicts determining of road condition in real-time, in accordance with an embodiment.

Referring now to FIG. 10, a method 1000 for determining road conditions is illustrated, in accordance with an exemplary embodiment. At step 1002, potholes and humps in a section of a road may be determined based on an image captured by a camera. At step 1004, potholes or the humps may be detected using the sensor data. Further, at step 1006, Z information (say, height and depth) of the potholes and the humps may be extracted based on the sensor data. This has already been explained in detail in conjunction with FIG. 2 to FIG. 8. These three steps may provide three parameters respectively, i.e., the $Param_1$, the $Param_2$, and the $Param_3$, that were used in the equation (7). Further, at step 1008, a regression analysis may be performed using the potholes and humps as detected at steps 1002 and 1004. At step, 1010, Z values scaling for each grid may be determined. Based on the output received from steps 1008 and 1010, road conditions may be determined at step 1012.

Figure 11:
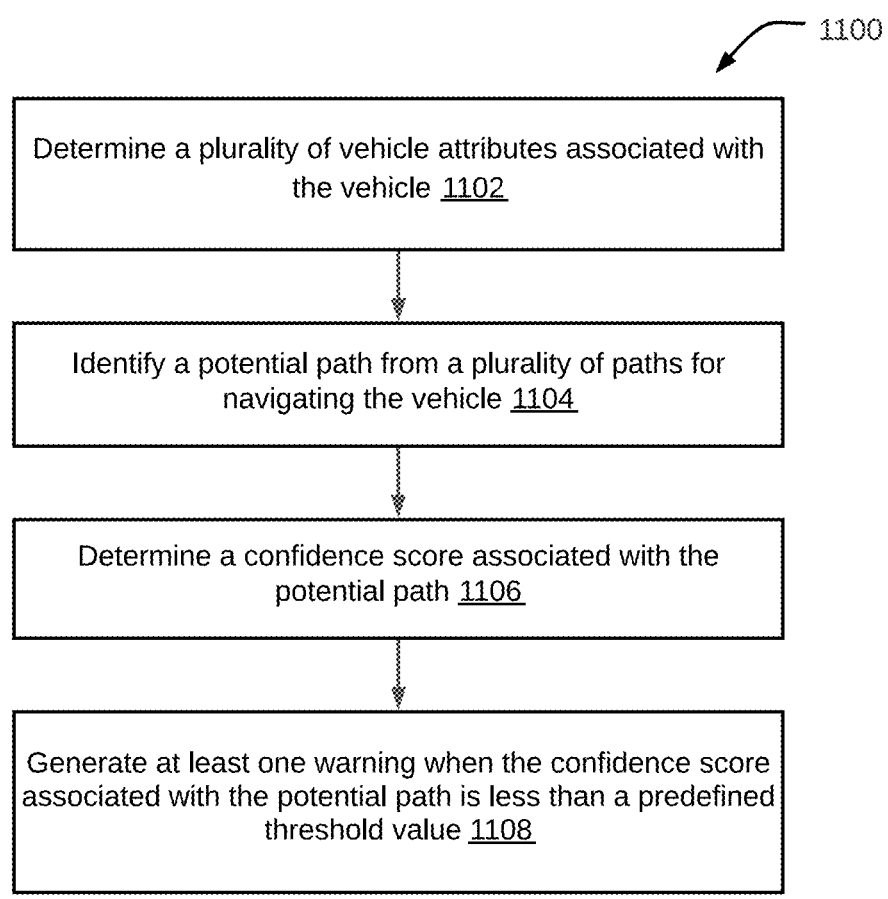
FIG. 11 is a flowchart of a method for navigating vehicles based on road conditions determined in real-time, in accordance with another embodiment.

Referring now to FIG. 11, a method for navigating vehicles based on road conditions determined in real-time is illustrated via a flowchart 1100, in accordance with an embodiment. Each step of the flowchart 1100 may be performed by various modules 318-322 within the navigation device 202. At step 1102, a plurality of vehicle attributes associated with the vehicle may be determined. The plurality of vehicle attributes may include, but are not limited to wheel width of the vehicle, ground clearance height of the vehicle, a CG of the vehicle, wheelbase of the vehicle, and number of wheels of the vehicle. At step 1104, a potential path from a plurality of paths may be identified for navigating the vehicle on the road. It should be noted that the potential path may be identified based on the value assigned to each of a plurality of grids in a digital elevation image and the plurality of attributes associated with the vehicle. The plurality of grids in the digital elevation image have already been explained in detail in conjunction with FIGS. 9A-9C.

Further, at step 1106, a confidence score associated with the potential path may be determined. A vehicle action while navigating the potential path and condition of the potential path may be considered to determine the confidence score. At step 1108, at least one warning may be generated, when the confidence score is less than a predefined threshold value.

In some embodiments, recommendations may be provided to driver for taking right action and avoiding bad road conditions. The navigation device 202 (which may be an on-board edge system) may continuously assess the road and update inputs (for example, warning and confidence level), in order to provide assistance. In some embodiments, a long-distance warning may be generated. The long-distance warning, for example, may be generated when the FOV is greater than 250 m. At a long-distance, overall condition of the road may be assessed. In case, the confidence score is less than a predefined threshold value, the warning for possible bad road condition may be generated. In an exemplary embodiment, the threshold value may vary based on rain, night condition, or the like. The warning may be generated using different colors, for example red, yellow, and green color. Additionally, each color may represent different level of confidence score and bad road condition.

Further, in some other embodiments, a mid-range warning may be generated for the FOV between 100 m and 250 m. The FOV within 250-meter distance may lead to more accurate prediction of results. A short-range warning may be generated for FOV that is less than 100 m distance. It should be noted that the confidence level of prediction is high for the road within a FOV of 100 m.

Figure 12A:
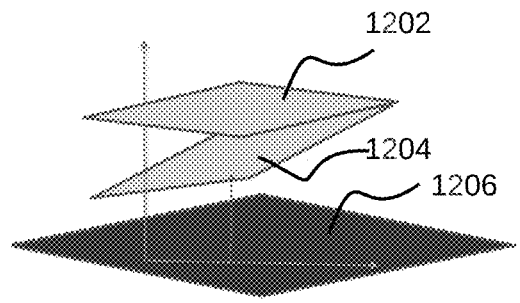
FIGS. 12A-12D are exemplary representations for determining a plurality of vehicle attributes associated with a vehicle, in accordance with an exemplary embodiment.

Referring now to FIGS. 12A-12D, exemplary representations for determining a plurality of vehicle attributes associated with the vehicle are illustrated, in accordance with an exemplary embodiment. The plurality of vehicle attributes may include ground clearance height of the vehicle and a CG of the vehicle. In FIG. 12A, three planes 1202, 1204, and 1206 may be represented. A top plane 1202 represents a plane of a car. This representation is for an ideal scenario where road condition is good or for a smooth road condition. A bottom plane 1206 represents a road, and a middle plane 1204 represents car plane when the road condition is bad. The ground clearance height may be a minimum distance between the bottom plane 1206 and the middle plane 1204. Further, the minimum ground clearance may be calculated by extending a perpendicular line from every grid that may intersect the car plane. In other words, the minimum ground clearance may depict the distance from road to an intersecting point of the car plane.

Figure 12B:
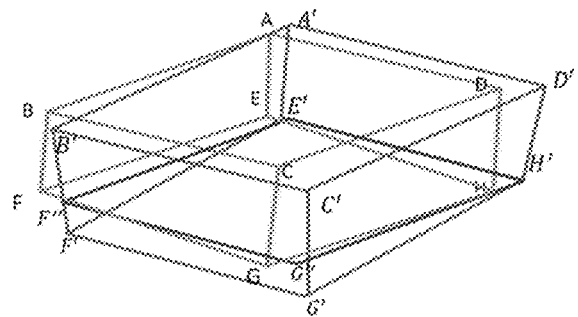

In FIG. 12B, 'ABCDEFGH' is a rectangular trapezoid where 'ABCD' represents a car plane and 'EFGH' represents a road surface. Now, consider that the car may be slightly tilted due to bad condition of the road. Therefore, the points 'A', 'B', 'C', 'D', 'E', 'F', 'G', and 'H' may be shifted to 'A′', 'B′', 'C′', 'D′', 'E″', 'F″', 'G″', and 'H″'. This shifting may be done when a left wheel of the car hits a pothole. However, overall ground is almost a plane surface. Hence, A′ B′ C′ D′ E′ F″ G″ H″ may be a new clearance trapezoid. Here, a perpendicular distance from E′ F″ G″ H″ to A′ B′ C′ D′ may be calculated.

Figure 12C:
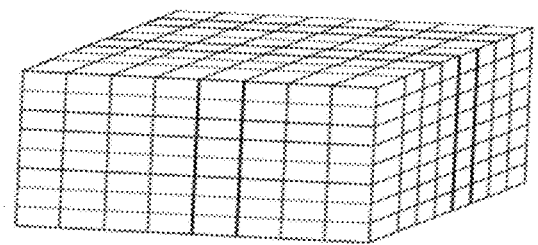
Figure 12D:
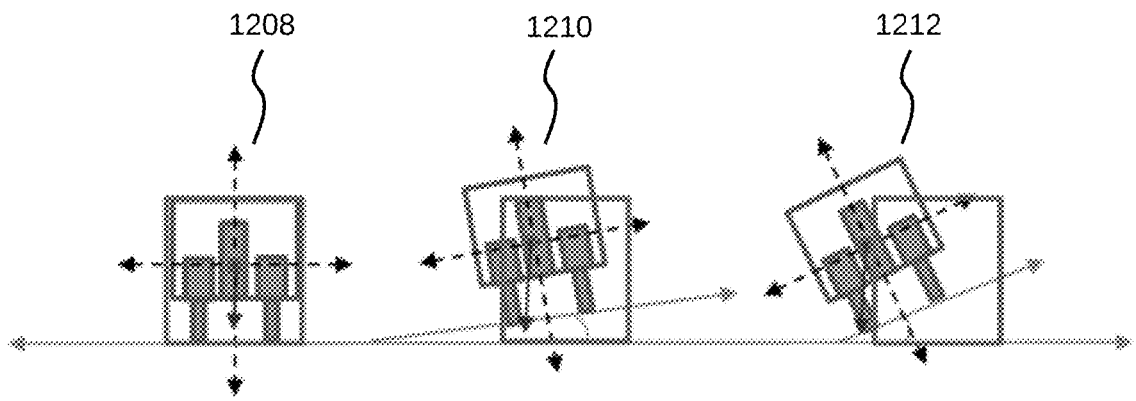

Referring to FIG. 12C, a grid structure of ground clearance space for a vehicle may be represented. Number of grids may vary depending upon the type of vehicle and it may vary from one vehicle to other. Further, the CG of the vehicle may be calculated in order to detect a stable path. Average location of all present object coordinates may be referred to as calculated CG position. In FIG. 12D, position 1208 depict that the car plane is not tilted, i.e., in an ideal condition, therefore this is a stable CG position. The positions 1210 and 1212 in FIG. 12D, depict that the car plane is tilted at different angles. However, the angle at which the car is tilted is different. In the position 1210, angle of tilt is less as compared to the angle of tilt in the position 1212. Therefore, the CG is stable in the position 1210, while the CG is unstable in the position 1212.

Figure 13A:
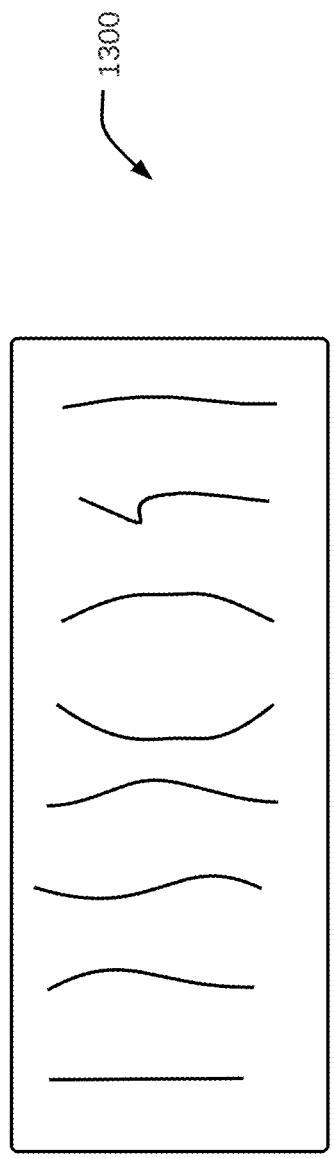
FIGS. 13A-13D are exemplary representations for identifying a potential path from a plurality of paths for navigating a vehicle on the road, in accordance with an embodiment.
Figure 13C:
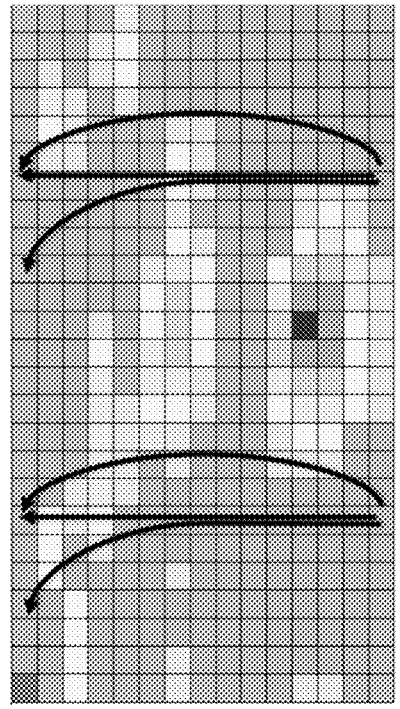
Figure 13B:
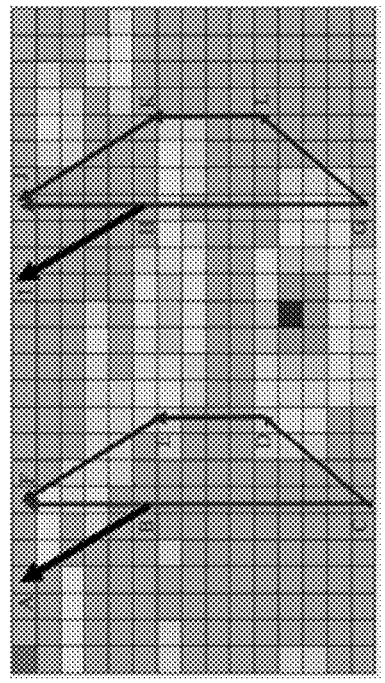

Referring now to FIGS. 13A-13D, exemplary representations for identifying a potential path from a plurality of paths for navigating the vehicle on the road are illustrated, in accordance with an exemplary embodiment. Various types of paths for navigating the vehicle are represented in FIG. 13A. Referring to FIG. 13B, a potential path may be detected based on road smoothness. The road smoothness may be summation of values of grids occupied by the wheels. Therefore, the road smoothness may also depend on condition of the wheels and number of wheels as well. In an exemplary embodiment, road smoothness may be calculated from a starting position of left and right wheels for a 3×3 window from the grid, as represented in the equation (8) given below:

$$\text{Road Smoothness}=2(\Sigma\text{Occupied Grids for Front Wheels}+\Sigma\text{Occupied Grids for Back Wheels}) \quad (8)$$

The window may be shifted to left or right of the current position for all wheel's positions, when the road smoothness is non-zero. Further, in case the road smoothness is zero, then there may be no need to shift the vehicle right or left. It may be noted that shifting of window may be the same for all wheels of the vehicle. As illustrated in FIG. 13B, the window may be shifted to front, left, and right. Initially, every path may try to move straight. However, if the straight path is not possible, the window may shift left or right. A window shifting tendency may depend upon a turning angle ratio.

FIG. 13C may represent a polynomial curve-fitting to derive a path for navigating the vehicle. This may be done in order to get best path in terms of smoothness. At every point in the path, radius of curvature may be verified and ensured that the radius is within a permissible range for the vehicle. It may further depend on velocity of the vehicle and turning angle of the vehicle.

Figure 13D:
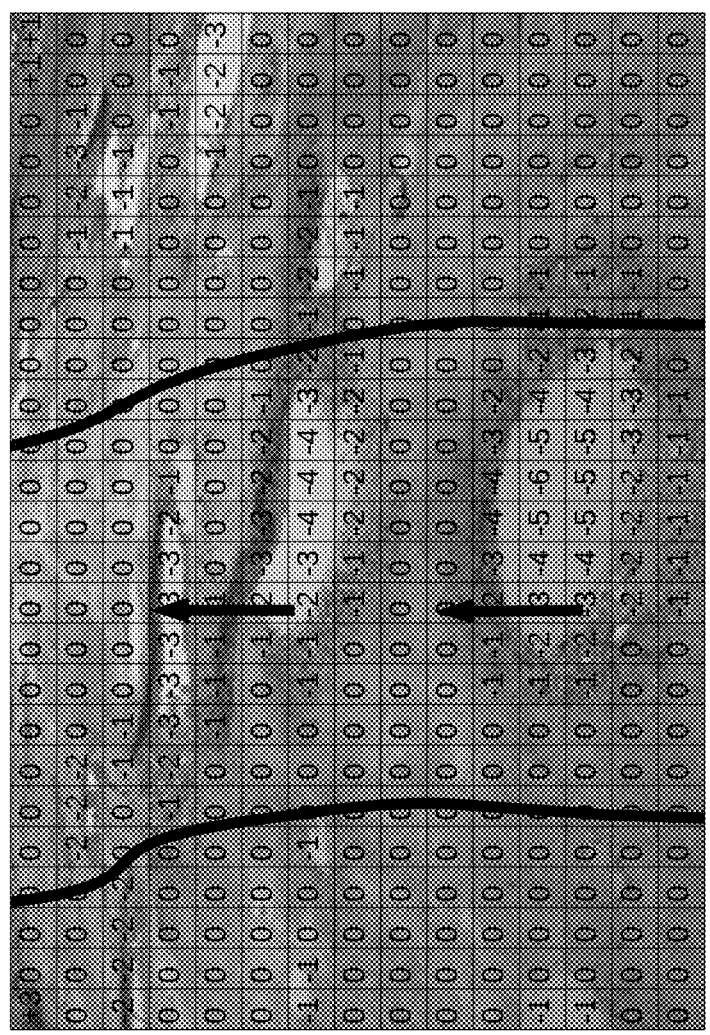

Referring to FIG. 13D, path selection may be performed based on a gridding approach. It is clearly visible in the FIG. 13D that the potential path may follow the grid value '0' or the values approaching to '0'. Here, each grid may represent a certain value of area, height or depth. Further, a few assumptions may be made based on traffic rules and regulations. For example, the vehicle must follow the left or right side of the road according to the traffic rules. The vehicles may be allowed to break traffic rules in worse scenario, for example, a very deep pothole cannot be avoided without breaking lane change rules. In an exemplary embodiment, a path for navigating the vehicle may be derived using the equation 9 given below. In this equation, grid value, width of the car wheel, ground clearance, and gap between two wheels are considered as input for a function 'f'.

$$\text{path} = f\begin{pmatrix} \text{Grid Value, Wheel Width, Ground Clearence Height,} \\ \text{Gap between Two Wheels, Number of Wheels} \end{pmatrix} \quad (9)$$

The present disclosure may provide many advantages in order to overcome the problems encountered in conventional systems and methods. As discussed above, the present disclosure may provide recommendations on right action to be taken by a vehicle for avoiding bad road conditions. The objective of the present disclosure is to achieve better safety for the vehicles by providing inputs which may be incorporated into a vehicle dashboard as a driver assistant. This may also be incorporated into an Autonomous vehicle (AV) to achieve the same purpose. The system may continuously assess the road and update the inputs (warning and confidence level).

Figure 14:
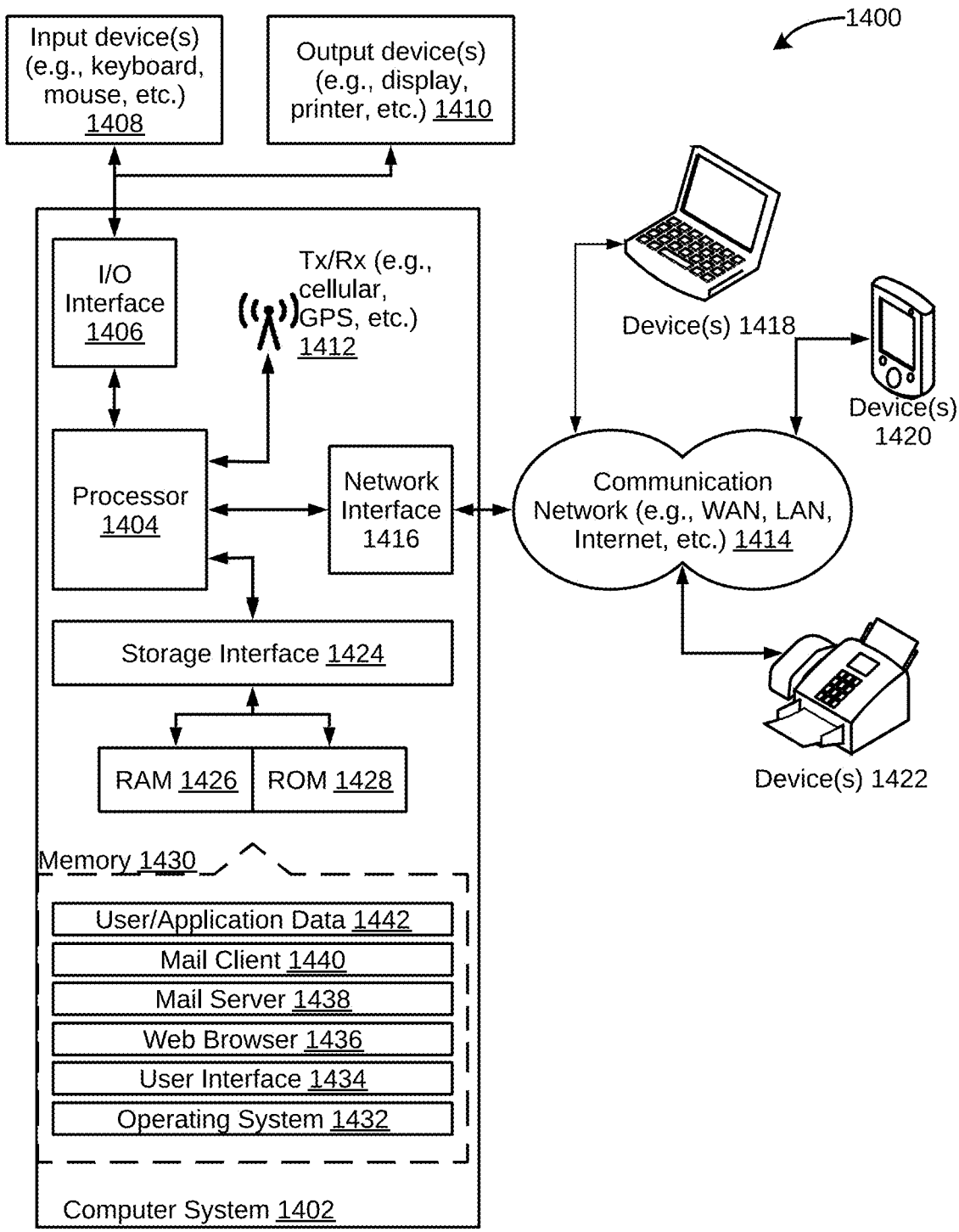
FIG. 14 illustrates a block diagram of an exemplary computer system for implementing embodiments consistent with the present disclosure.

Referring now to FIG. 14, a block diagram of an exemplary computer system 1402 for implementing various embodiments is illustrated. Computer system 1402 may include a central processing unit ("CPU" or "processor") 1404. Processor 1404 may include at least one data processor for executing program components for executing user or system-generated requests. A user may include a person, a person using a device such as those included in this disclosure, or such a device itself. Processor 1404 may include specialized processing units such as integrated system (bus) controllers, memory management control units, floating point units, graphics processing units, digital signal processing units, etc. Processor 1404 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1404 may be disposed in communication with one or more input/output (I/O) devices via an I/O interface 1406. I/O interface 1406 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1402.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1406, computer system 1402 may communicate with one or more I/O devices. For example, an input device 1408 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1410 may be a printer, fax machine, video display (for example, cathode ray tube (CRT), liquid crystal display (LCD), light-emitting diode (LED), plasma, or the like), audio speaker, etc. In some embodiments, a transceiver 1412 may be disposed in connection with processor 1404. Transceiver 1412 may facilitate various types of wireless transmission or reception. For example, transceiver 1412 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1404 may be disposed in communication with a communication network 1414 via a network interface 1416. Network interface 1416 may communicate with communication network 1414. Network interface 1416 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1414 may include, without limitation, a direct interconnection, local area network (LAN), wide area network (WAN), wireless network (for example, using Wireless Application Protocol), the Internet, etc. Using network interface 1416 and communication network 1414, computer system 1402 may communicate with devices 1418, 1420, and 1422. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1402 may itself embody one or more of these devices.

In some embodiments, processor 1404 may be disposed in communication with one or more memory devices (for example, RAM 1426, ROM 1428, etc.) via a storage interface 1424. Storage interface 1424 may connect to memory 1430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1430 may store a collection of program or database components, including, without limitation, an operating system 1432, user interface application 1434, web browser 1436, mail server 1438, mail client 1440, user/application data 1442 (for example, any data variables or data records discussed in this disclosure), etc. Operating system 1432 may facilitate resource management and operation of computer system 1402. Examples of operating systems 1432 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1434 may facilitate display, execution, interaction, manipulation, or operation of program components through textual or graphical facilities. For example, user interfaces 1434 may provide computer interaction interface elements on a display system operatively connected to computer system 1402, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1402 may implement a web browser 1436 stored program component. Web browser 1436 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 1436 may utilize facilities such as AJAX, DHTML, ADOBE® FLASH® platform, JAVASCRIPT® programming language, JAVA® programming language, application programming interfaces (APIs), etc. In some embodiments, computer system 1402 may implement a mail server 1438 stored program component. Mail server 1438 may be an Internet mail server such as MICROSOFT® EXCHANGE® mail server, or the like. Mail server 1438 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1438 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1402 may implement a mail client 1440 stored program component. Mail client 1440 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1402 may store user/application data 1442, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for navigating vehicles based on road conditions determined in real-time. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for navigating vehicles based on road conditions determined in real-time, the method comprising:
receiving, by a navigation device, a first dataset comprising an image of a section of a road within a Field of View (FOV) of a camera attached to a vehicle and a second dataset associated with the road;
detecting, by the navigation device, edges and a vanishing point in the image based on the first dataset using an image processing technique;
correcting, by the navigation device, road perspectivity in the image based on at least one of the edges, the vanishing point, or the FOV;
determining, by the navigation device, surface anomalies in the road based on a set of parameters, based on the second dataset and a Time of Flight technique (ToF), wherein the set of parameters comprises volume associated with the surface anomalies;
creating, by the navigation device, a digital elevation model for the image based on the road perspectivity, the surface anomalies, and an output of processing the image by a Convolutional Neural Network (CNN), wherein the CNN is trained to identify road conditions from a plurality of test images; and
assigning in real-time, by the navigation device, a value from a predefined value range to each of a plurality of grids in the image based on the digital elevation model to generate a digital elevation image, wherein each value in the predefined value range represents condition of the road in an associated grid from the plurality of grids, and wherein the digital elevation image is used to navigate the vehicle.

2. The method of claim 1, further comprising capturing the first dataset and the second dataset using at least one of a plurality of sensors attached to the vehicle, wherein the plurality of sensors comprises at least one of a camera, a Kinect like sensor, a distance sensor, or an Infrared (IR) sensor.

3. The method of claim 1, wherein detecting the vanishing point comprises extending at least two of the plurality of edges till an intersection point of the at least two of the plurality of edges is identified.

4. The method of claim 1, further comprising generating a topographic map for the road based on the value assigned to each of the plurality of grids, wherein the topographic map represents the road conditions.

5. The method of claim 1, further comprising determining a relationship between the first dataset and the second dataset by mapping Two Dimensional (2D) points in a 2D image with Three dimensional (3D) points in the real-world.

6. The method of claim 1, further comprising navigating the vehicle based on the digital elevation image comprising the plurality of grids having values assigned from the predefined value range.

7. The method of claim 1, further comprising determining a plurality of vehicle attributes associated with the vehicle, wherein the plurality of vehicle attributes comprises wheel width of the vehicle, ground clearance height of the vehicle, a center of gravity (CG) of the vehicle, wheel base of the vehicle, and number of wheels of the vehicle.

8. The method of claim 7, further comprising identifying a potential path from a plurality of paths for navigating the vehicle on the road based on the value assigned to each of the plurality of grids in the digital elevation image and the plurality of vehicle attributes associated with the vehicle.

9. The method of claim 8, further comprising determining a confidence score associated with the potential path based on a condition of the potential path and a vehicle action while navigating the potential path.

10. The method of claim 9, further comprising generating at least one warning when the confidence score associated with the potential path is less than a predefined threshold value.

11. A system for navigating vehicles based on road conditions determined in real-time, the system comprising:
a processor; and
a memory communicatively coupled to the processor, wherein the memory stores processor instructions, which, on execution, causes the processor to:
receive a first dataset comprising an image of a section of a road within a Field of View (FOV) of a camera attached to a vehicle and a second dataset associated with the road;
detect edges and a vanishing point in the image based on the first dataset using an image processing technique;
correct road perspectivity in the image based on at least one of the edges, the vanishing point, or the FOV;
determine surface anomalies in the road based on a set of parameters, based on the second dataset and a Time of Flight technique (ToF), wherein the set of parameters comprises volume associated with the surface anomalies;
create a digital elevation model for the image based on the road perspectivity, the surface anomalies, and an output of processing the image by a Convolutional Neural Network (CNN), wherein the CNN is trained to identify road conditions from a plurality of test images; and
assign, in real-time, a value from a predefined value range to each of a plurality of grids in the image based on the digital elevation model to generate a digital elevation image, wherein each value in the predefined value range represents condition of the road in an associated grid from the plurality of grids, and wherein the digital elevation image is used to navigate the vehicle.

12. The system of claim 11, wherein the processor instructions further cause the processor to capture the first dataset and the second dataset using at least one of a plurality of sensors attached to the vehicle, wherein the plurality of sensors comprises at least one of a camera, a Kinect like sensor, a distance sensor, or an Infrared (IR) sensor.

13. The system of claim 11, wherein the processor instructions further cause the processor to detect the vanishing point by extending at least two of the plurality of edges till an intersection point of the at least two of the plurality of edges is identified.

14. The system of claim 11, wherein the processor instructions further cause the processor to generate a topographic map for the road based on the value assigned to each of the plurality of grids, wherein the topographic map represents the road conditions.

15. The system of claim 11, wherein the processor instructions further cause the processor to determine a relationship between the first dataset and the second dataset by mapping Two Dimensional (2D) points in a 2D image with Three dimensional (3D) points in the real-world.

16. The system of claim 11, wherein the processor instructions further cause the processor to navigate the vehicle based on the digital elevation image comprising the plurality of grids having values assigned from the predefined value range.

17. The system of claim 11, wherein the processor instructions further cause the processor to determine a plurality of vehicle attributes associated with the vehicle, wherein the plurality of vehicle attributes comprises wheel width of the vehicle, ground clearance height of the vehicle, a center of gravity (CG) of the vehicle, wheel base of the vehicle, and number of wheels of the vehicle.

18. The system of claim 17, wherein the processor instructions further cause the processor to identify a potential path from a plurality of paths for navigating the vehicle on the road based on the value assigned to each of the plurality of grids in the digital elevation image and the plurality of vehicle attributes associated with the vehicle.

19. The system of claim 18, wherein the processor instructions further cause the processor to:
   determine a confidence score associated with the potential path based on a condition of the potential path and a vehicle action while navigating the potential path; and
   generate at least one warning when the confidence score associated with the potential path is less than a predefined threshold value.

20. A non-transitory computer-readable medium for navigating vehicles based on road conditions determined in real-time, having stored thereon, a set of computer-executable instructions causing a computer comprising one or more processors to perform steps comprising:

receiving a first dataset comprising an image of a section of a road within a Field of View (FOV) of a camera attached to a vehicle and a second dataset associated with the road;
   detecting edges and a vanishing point in the image based on the first dataset using an image processing technique;
   correcting road perspectivity in the image based on at least one of the edges, the vanishing point, or the FOV;
   determining surface anomalies in the road based on a set of parameters, based on the second dataset and a Time of Flight technique (ToF), wherein the set of parameters comprises volume associated with the surface anomalies;
   creating a digital elevation model for the image based on the road perspectivity, the surface anomalies, and an output of processing the image by a Convolutional Neural Network (CNN), wherein the CNN is trained to identify road conditions from a plurality of test images; and
   assigning, in real-time, a value from a predefined value range to each of a plurality of grids in the image based on the digital elevation model to generate a digital elevation image, wherein each value in the predefined value range represents condition of the road in an associated grid from the plurality of grids, and wherein the digital elevation image is used to navigate the vehicle.

* * * * *